(12) United States Patent
Li et al.

(10) Patent No.: US 12,210,132 B2
(45) Date of Patent: Jan. 28, 2025

(54) METHOD AND SYSTEM FOR EXPLORING HIDDEN KARST PIPELINES

(71) Applicant: SHANDONG UNIVERSITY, Shandong (CN)

(72) Inventors: Shucai Li, Jinan (CN); Huaifeng Sun, Jinan (CN); Nuoya Zhang, Jinan (CN); Jing Yang, Jinan (CN); Yang Yang, Jinan (CN); Ziqiang Zheng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 295 days.

(21) Appl. No.: 18/007,567

(22) PCT Filed: Jun. 29, 2021

(86) PCT No.: PCT/CN2021/103199
§ 371 (c)(1),
(2) Date: Dec. 1, 2022

(87) PCT Pub. No.: WO2022/002071
PCT Pub. Date: Jan. 6, 2022

(65) Prior Publication Data
US 2023/0333276 A1 Oct. 19, 2023

(30) Foreign Application Priority Data

Jun. 29, 2020 (CN) .......................... 202010603031.1

(51) Int. Cl.
*G01V 3/17* (2006.01)
*G01V 3/38* (2006.01)
(52) U.S. Cl.
CPC . *G01V 3/17* (2013.01); *G01V 3/38* (2013.01)
(58) Field of Classification Search
CPC ... G01V 3/17; G01V 3/38; G01V 3/12; Y02A 90/30
See application file for complete search history.

(56) References Cited

U.S. PATENT DOCUMENTS 11,150,375 B2 * 10/2021 Zhang ..................... G01V 3/30
2003/0062902 A1    4/2003 Stolarezyk
(Continued)

FOREIGN PATENT DOCUMENTS

| CN | 103064120 A | 4/2013 |
|---|---|---|
| CN | 103207412 A | 7/2013 |

(Continued)

OTHER PUBLICATIONS

Liu Fu-bo et al., "Development and application of a new semi-airborne transient electromagnetic system with UAV platform", Progress in Geophysics, vol. 32, No. 5, (2017), pp. 2222-2229.
(Continued)

*Primary Examiner* — Dominic E Hawkins
(74) *Attorney, Agent, or Firm* — Oliff PLC

(57) ABSTRACT

A method and system for exploring hidden karst pipelines, mainly comprising: determining an upstream and a downstream of an underground karst pipeline; laying a grounding electrode at the upstream and the downstream respectively; establishing an electromagnetic emission system through underground karst water channels in the underground karst pipeline in a survey area, a transmitter and a generator; arranging a receiving system through an air mobile equipment towing a receiver as a receiving end; turning on the electromagnetic emission system; a generator supplying power to emission circuit; controlling the air mobile equipment to move along routes to collect signal continuously above the survey area, to complete an area-based measurement, and obtain observed data in the whole survey area; processing the observed data; delineating a concrete distribution of the underground karst water channels from the to the, such as a net-shaped path diagram or a tree-shaped path diagram.

8 Claims, 1 Drawing Sheet

(56) References Cited

U.S. PATENT DOCUMENTS

| | | | |
|---|---|---|---|
| 2007/0159320 A1* | 7/2007 | Lee | H04L 12/2801 340/870.01 |
| 2012/0229321 A1 | 9/2012 | Holly et al. | |
| 2014/0200808 A1* | 7/2014 | Zhang | G01V 3/30 702/7 |
| 2021/0018646 A1* | 1/2021 | Hoang | E21B 49/00 |

FOREIGN PATENT DOCUMENTS

| | | |
|---|---|---|
| CN | 103728659 A | 4/2014 |
| CN | 203658602 U | 6/2014 |
| CN | 104597506 A | 5/2015 |
| CN | 104597511 A | 5/2015 |
| CN | 105301663 A | 2/2016 |
| CN | 106547030 A | 3/2017 |
| CN | 108152854 A | 6/2018 |
| CN | 108549099 A | 9/2018 |
| CN | 108680961 A | 10/2018 |
| CN | 109031428 A | 12/2018 |
| CN | 110133737 A | 8/2019 |
| CN | 110470914 A | 11/2019 |
| CN | 110471117 A | 11/2019 |
| CN | 110608721 A | 12/2019 |
| CN | 111104374 A | 5/2020 |
| CN | 111239839 A | 6/2020 |
| CN | 111812724 A | 10/2020 |
| EP | 0 067 514 A1 | 12/1982 |
| IN | 105866848 A | 8/2016 |
| WO | WO-2021098667 A1 * | 5/2021 ............. G01R 33/12 |

OTHER PUBLICATIONS

Li Shucai et al., "Advanced Geology Prediction With Parallel Transient Electromagnetic Detection in Tunnelling", Chinese Journal of Rock Mechanics and Engineering, vol. 33, No. 7, (2014), pp. 1309-1318.

Mar. 5, 2021, Office Action issued in Chinese Patent Application No. 202010603031.1.

Sep. 28, 2021, International Search Report issued in International Patent Application No. PCT/CN2021/103199.

Sep. 28, 2021, Written Opinion issued in International Patent Application No. PCT/CN2021/103199.

* cited by examiner

METHOD AND SYSTEM FOR EXPLORING HIDDEN KARST PIPELINES

CROSS-REFERENCES TO RELATED APPLICATIONS

This application claims priority benefits to Chinese Patent Application No. 202010603031.1, filed 29 Jun. 2020, the contents of which are incorporated herein by reference.

TECHNICAL FIELD

The present invention belongs to the field of karst geological exploration, specifically relates to a method and system for exploring hidden karst pipelines.

BACKGROUND

Karst is formed by groundwater erosion of soluble rock under the action of dissolution. One third of China's land area is tuff distribution area, wherein the most developed karst areas are located in Yunnan, Guizhou, Guangxi, southern Sichuan and other areas. It is of great significance to study the distribution of underground karst to understand and analyze the regional karst geology, which is very important in the fields of engineering, environment, water resources, etc.

At present, the commonly method of karst geological investigation includes the geological survey method, the connectivity test, the pumping test in borehole, the geophysical method, etc. Among that, the geological survey method mainly relies on the surface investigation, including the investigation of obvious geological phenomena such as ascending springs, depression springs, karst collapse, etc. It is impossible to carry out effective investigation of underground hidden karst without these obvious surface phenomena. The connectivity test needs to put tracer in the upstream and detect it in the downstream, which can only determine the connectivity of two points, but cannot locate and infer the distribution of underground karst pipelines. The pumping test in borehole is usually used to evaluate the development of karst in a certain borehole area and a small area around it. Large-scale area detection may be costly. The geophysical survey method is a common underground imaging method for hidden karst, such as ground penetrating rada (GPR), multi-electrode resistivity method, transient electromagnetic method (TEM), seismic method, magnetotelluric method, controlled source audio-frequency magnetotelluric method (CSAMT) and drilling, etc. Due to the limitation of instrumentation and the methodology, multi-electrode resistivity, seismic method, and GPR are mainly to be applied in surface geophysical exploration. The magnetotelluric method and CSAMT method require the strict field source layout and have detection blind area, which are often used for the exploration of deep anomalies. These methods are not suitable for large depth exploration. Sometimes there are false anomalies in the detection results, which can easily confuse the geological interpretation. Especially in some survey areas with large exploration areas and unknown target areas, geophysical exploration is extremely expensive and inefficient.

SUMMARY

Considering that there is no available method for the exploration of hidden karst pipelines, the present invention discloses a method and system for the exploration of hidden karst pipelines, which can realize the exploration of the hidden karst pipeline.

In order to achieve the above purpose, the technical solutions adopted in the present invention are as follows:

In a first aspect, the present invention proposes a method for exploring hidden karst pipelines, comprising the steps of:
  Step 1: determining an upstream point A and a downstream point B of an underground karst pipeline;
  Step 2: laying grounding electrodes at the upstream point A and the downstream point B, and then establishing an electromagnetic emission system via hidden karst water channels in a survey area, a transmitter, and a generator;
  Step 3: arranging a receiving system through an air mobile equipment towing a receiver as a receiving end;
  Step 4: turning on the electromagnetic emission system;
  Step 5: controlling the air mobile equipment to move along routes designed according to geological survey results to collect electromagnetic signal continuously above the survey area, to complete an area-based measurement, to obtain observed data in the whole survey area; and
  Step 6: processing the observed data; delineating a concrete distribution of the underground karst water channels from the point A to the point B, such as a net-shaped path diagram or a tree-shaped path diagram.

As a further technical solution, a specific method for Step 1 is as follows:
  the upstream point A and the downstream point B need to be two clearly outcropping ascending or depression springs, or the presence of flowing groundwater found through drilling.

As a further technical solution, a specific method for Step 4 is as follows:
  the transmitter supplies different encoded waveforms containing different frequencies (frequency domain) and different duty cycles (time domain) to the emission system; at the same time, the emission waveforms and currents are recorded for subsequent data processing. The transmitter synchronizes time with the receiving end through a GPS or a quartz clock.

As a further technical solution, a specific method for Step 5 is as follows:
  measuring by an aircraft towing a magnetic field sensor and flying according to the designed routes; if necessary, multiple aircraft may be adapted to work in parallel, and collection processes of all the aircraft need to carry out a time synchronization with the emission end through the GPS or the quartz clock.

As a further technical solution, a specific method for Step 6 is as follows:
  obtaining information of an amplitude and a phase corresponding to each single frequency electromagnetic wave data after performing a discrete Fourier transform on the observed data first;
  drawing an amplitude contour sheet after normalizing the amplitude, and drawing a phase contour map after normalizing the phase;
  calculating an electrical conductivity in the survey area and drawing a plane distribution map thereof, the different values (high and low) of the electrical conductivity are shown in different color scales, and a result thereof is a tree root-like shape, which may make the potential hidden karst pipelines be seen clearly; and
  according to and integrating abnormal areas in the amplitude contour map, the phase contour map and the conductivity distribution map, delineating a concrete distribution of the underground karst water channels from the point A to the point B, such as a net-shaped path diagram or a tree-shaped path diagram.

In a second aspect, based on the method for exploring the hidden karst pipelines mentioned above, the present invention further provides a system for exploring hidden karst pipelines, comprising: an air mobile equipment, a transmitter, a receiver, a receiving sensor, an electrode, a power supply device and a data processing device;

the transmitter, the power supply device and underground karst water channels in a karst pipeline connected with two electrodes form an electromagnetic emission system, and the two electrodes are laid at an upstream point A and a downstream point B of the karst pipeline respectively;

the air mobile equipment, towing the receiver, collects electromagnetic signal continuously by following a designed route above the survey area, to complete an area-based measurement, so as to obtain an observed data in the whole survey area; and the data processing device processes the obtained observed data to delineating a concrete distribution of the underground karst water channels.

As a further technical solution, the data processing device comprises:

a discrete Fourier transform module, being configured to perform a discrete Fourier transform on the observed signal to obtain information of an amplitude and a phase corresponding to each single frequency electromagnetic wave after the discrete Fourier transform;

a normalization processing module, being configured to draw an amplitude contour map after normalizing the amplitude, and to draw a phase contour map of after normalizing the phase; and a calculation and delineating module, being configured to calculate an electrical conductivity and draw a plane distribution map thereof, of which a result is a tree root-like shape through showing different high and low values by different color scales, which may allow a clear view of potential hidden karst pipelines; according to and integrating abnormal areas in the amplitude contour map, the phase contour map and the conductivity distribution map, delineating a concrete distribution of the underground karst water channels from the point A to the point B, such as a net-shaped path diagram or a tree-shaped path diagram.

The beneficial effects of the present invention are as follow:

(1) the present invention has a simple structure and can simply and quickly explore the hidden karst pipeline system;

(2) according to the present invention, delineating a net-shaped path diagram or a tree-shaped path diagram of the underground karst water from the point A to the point B can assist in regional karst geological modeling; and (3) according to the present invention, proposing the method without steps such as drilling, pumping water, etc., which therefore is conducive to groundwater protection and achieves coordination between regional development and ecological environmental protection.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
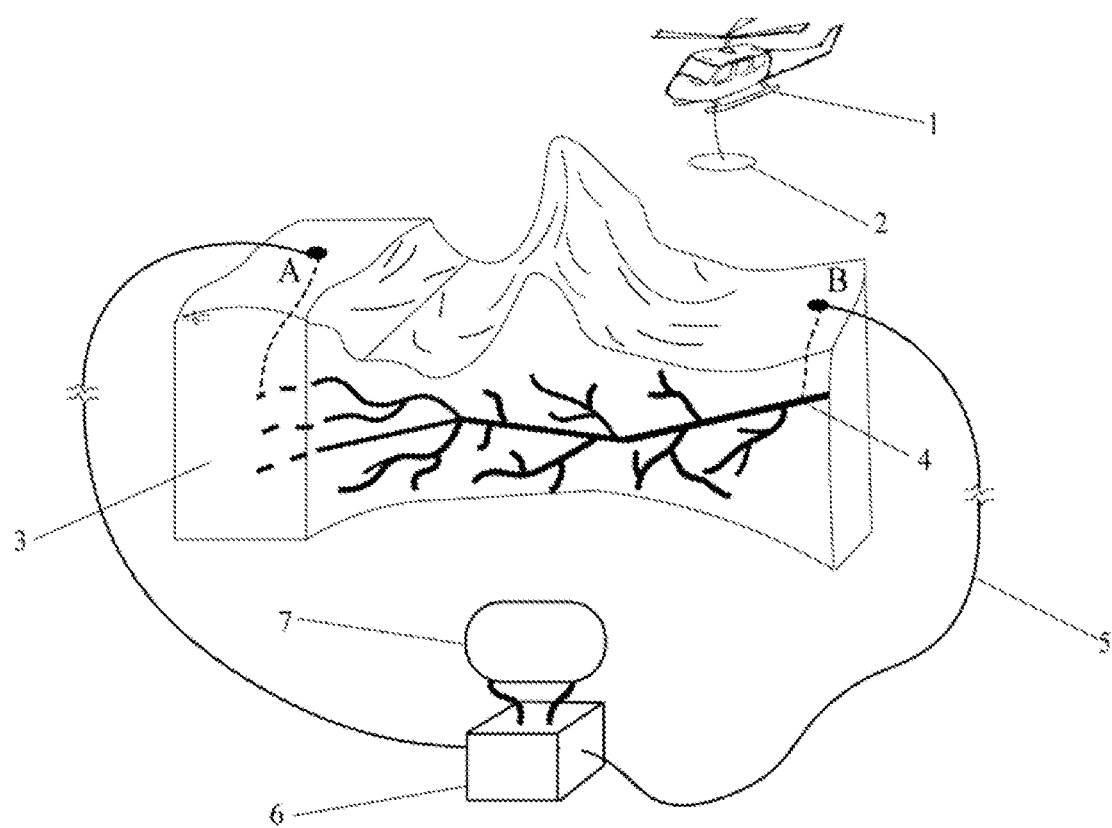
FIG. 1 shows a schematic diagram of the working process of the present invention.

In FIGURES: 1, unmanned aerial vehicle (UAV); 2, receiving coil; 3, survey area; 4, hidden karst channel; 5, wire; 6, transmitter; 7, generator.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

As introduced in the background technology, the karst geological investigation method in the prior art comprises geological survey method, connectivity test, pumping test in borehole, geophysical method, etc., which all have shortcomings. Considering that there is no available method for the exploration of hidden karst pipelines, the present invention discloses a method and system for the exploration of hidden karst pipelines.

In a typical implementation of the present invention, as shown in FIG. 1, the equipment mainly used in the method comprises an UAV 1, a receiving coil 2, a transmitter 6, a generator 7 and a data processing device.

The UAV 1 is an existing unmanned aerial vehicle, which is not described in detail herein. It should be understood that, in other examples, the UAV can be replaced by any other flyable device that can move through the air with the receiving coil.

The receiving coil 2 mainly receives an electromagnetic wave transmitted by the transmitter on the ground. The receiving coil adopts a receiving mode of collecting waveform with full time, full frequency and high sampling rate, and completes a data collection in a scanning mode in the air. Specific settings can be made according to actual needs, and the receiving coil also has an existing structure, which is not described in detail here. It should be understood that the receiving coil 2 can be replaced by an electromagnetic rod.

The transmitter 6, the generator 7 and the underground karst water channels in the karst pipeline in the survey area establish an electromagnetic emission system, referring to FIG. 1, the two grounding electrodes laid at the point A and the point B respectively are connected to each other by wires and then connected to the transmitter 6 being connected to the generator 7 supplying power to the transmitter 6; wherein, the wires with low-resistance should be placed outside of the survey area as far as possible to avoid interference with the data collection. Measuring the grounding resistance and then estimating the electrical load, wherein, an output power of the generator is generally selected at 80% of the rated power.

The data processing device, mainly for processing the data received by the receiving coil 2 to obtain a distribution map of karst pipeline, comprises a discrete Fourier transform module, a normalization processing module and a calculation and delineating module, wherein:

the discrete Fourier transform module, configured to perform a discrete Fourier transform on the observed signal, using the formula as follows:

$$X(k) = \sum_{n=0}^{N-1} x(n)\left(\cos 2\pi k\frac{n}{N} - j\sin 2\pi k\frac{n}{N}\right), (k = 0, 1, 2, \ldots N-1),$$

wherein X(k) denotes the data after the discrete Fourier transforms and x(n) is an analog signal of the sample. And after the discrete Fourier transform, the information of amplitude and phase corresponding to each single-frequency electromagnetic wave data are obtained;

the normalization processing module, being configured to draw an amplitude contour map after normalizing the amplitude, and to draw a phase contour map of after normalizing the phase;

the calculation and delineating module, configured to calculate an electrical conductivity in the survey area and draw a plane distribution map thereof, wherein the different high and low values of the electrical conductivity are shown in different color scales, and a result thereof is a tree root-like shape, which may make the potential hidden karst pipelines be seen clearly; according to and integrating abnormal areas in the amplitude contour map, the phase contour map and the conductivity distribution map, delineating a concrete distribution of the underground karst water channels from the point A to the point B, such as a net-shaped path diagram or a tree-shaped path diagram.

The following is a detailed description of the exploration method of the present invention.

According to the present invention, finding at least two surface outcropping areas by investigation, such as ascending or depression springs, artificially constructed boreholes, karst collapses with flowing water, etc., and naming an upstream point as Point A and a downstream point as Point B. The grounding electrodes are laid at the point A and the point B respectively and connected through a wire, the transmitter powered by the generator is connected in the middle thereof. The two electrodes at the point A and point B and the wires on the ground surface are as an external circuit. Through the flow of a specially designed emission current in the transmitter, the underground karst water that belongs to the material with low resistivity being compared with the surrounding limestone and is approximately considered as a net-shaped conductor which can conduct the current may form a closed circuit system with the external circuit on the ground. The data collection may be completed by means of scanning in the air by using the UAV towing the special electromagnetic field collection coils or magnetic rods. The underground well-conducting medium may exhibit a low-resistance characteristic under the action of electromagnetic induction, then a secondary field is induced and then received by the receiver, then the characteristics, such as the distribution range, the vein structure, the connectivity, etc. of the hidden karst pipeline can be obtained through the signal processing and coordinate mapping, wherein, the good connectivity area and the bad connectivity area will show different colors because of the difference of electrical conductivity, and the color may be used to assist in judging the underground concrete distribution of the hidden karst pipeline.

The specific steps are as follows:

Step 1: determining typical outcrops of underground karst water channels, comprising but not limited to surface outcrops and borehole outcrops, by means of geological reconnaissance, investigation, drilling, etc. in the survey area; determining the upstream point A and the downstream point B of the underground karst pipeline by the measurement of waterheads of all outcrops and regional hydrogeological analysis;

Step 2: establishing an electromagnetic emission system utilizing the underground karst water channels in the karst pipeline in the survey area, the transmitter and the generator, comprising: laying the grounding electrodes at the point A and the point B respectively; the two grounding electrodes are connected through wires and then connected to the transmitter and generator, wherein the wires with low-resistance should be placed outside of the survey area as far as possible to avoid interference with the data collection; measuring the grounding resistance and estimating the electrical load, wherein an output power of the generator is generally selected at 80% of the rated power;

Step 3: turning on the electromagnetic emission system; if the grounding resistance is too high, an electrolyte can be continuously added into the underground karst water at the pole A, and by considering the pollution problem of groundwater, the table salt is suitable as the electrolyte;

Step 4: supplying power to the electromagnetic emission system by the generator. The waveform emissioned by the transmitter is a mixed electromagnetic wave comprising n frequencies, and a coding method thereof takes a pseudo-random signal sequence such as a 2n sequence, m sequence, M sequence, etc.; generally, it takes the direct superposition of multiple sine waves, and the composition of the frequency and the coding method can be determined according to a burial depth of the hidden karst;

Step 5: arranging the receiving system using the UAV towing the receiver being as a receiving end; wherein the receiving coil adopts a receiving mode of full-time, full-frequency and high-sampling-rate to collect the waveform;

Step 6: controlling the UAV to move along routes designed according to geological survey results to collect electromagnetic signal continuously above the survey area, to complete an area-based measurement, to obtain observed data in the whole survey area;

Step 7: processing the observed data; wherein, first performing a discrete Fourier transform on the observed signal, the formula is as follows:

$$X(k) = \sum_{n=0}^{N-1} x(n)\left(\cos 2\pi k\frac{n}{N} - j\sin 2\pi k\frac{n}{N}\right), (k = 0, 1, 2, \ldots N-1),$$

wherein X(k) denotes the data after discrete Fourier transform, and x(n) is the analog signal of the sample. Obtaining the information of the amplitude and the phase corresponding to each the single-frequency electromagnetic wave data after the discrete Fourier transform;

Step 8: drawing an amplitude contour map after normalizing the amplitude, and drawing a phase contour map of after normalizing the phase as well;

Step 9: calculating an electrical conductivity in the survey area and drawing a plane distribution map thereof, wherein the different high and low values of the electrical conductivity are shown in different color scales, and a result thereof is a tree root-like shape, which may make the potential hidden karst pipelines be seen clearly; and Step 10: according to and integrating abnormal areas in the amplitude contour map, the phase contour map and the conductivity distribution map, delineating a concrete distribution of the underground karst water channels from the point A to the point B, such as a net-shaped path diagram or a tree-shaped path diagram.

The foregoing descriptions are merely preferred embodiments of the present invention, but not intended to limit the present invention. A person skilled in the art may make various alterations and variations to the present invention. Any modification, equivalent replacement, or improvement made etc. within the spirit and principle of the present invention shall fall within the protection scope of the present invention.

What is claimed is:

1. A method for exploring hidden karst pipelines, comprising the steps of:
    Step 1: determining an upstream point A and a downstream point B of an underground karst pipeline;
    Step 2: laying a grounding electrode at the upstream point A and the downstream point B respectively; establishing an electromagnetic emission system through underground karst water channels in the underground karst pipeline in a survey area, a transmitter and a generator;
    Step 3: arranging a receiving system through an air mobile equipment towing a receiver as a receiving end;
    Step 4: turning on the electromagnetic emission system, then the generator supplies power to an emission circuit of the electromagnetic emission system;
    Step 5: controlling the air mobile equipment to move along routes designed according to geological survey results to collect electromagnetic signal continuously above the survey area, to complete an area-based measurement, to obtain observed data in the whole survey area; and
    Step 6: processing the observed data; delineating a concrete distribution of the underground karst water channels from the point A to the point B, such as a net-shaped path diagram or a tree-shaped path diagram, wherein comprising the specific steps of:
    obtaining information of an amplitude and a phase corresponding to each single frequency electromagnetic wave data after performing a discrete Fourier transform on the observed data first;
    drawing an amplitude contour sheet after normalizing the amplitude, and drawing a phase contour map after normalizing the phase;
    calculating an electrical conductivity in the survey area and drawing a plane distribution map thereof, the different high and low values of the electrical conductivity are shown in different color scales, and a result thereof is a tree root-like shape, which may make the potential hidden karst pipelines be seen clearly; and
    according to and integrating abnormal areas in the amplitude contour map, the phase contour map and the conductivity distribution map, delineating a concrete distribution of the underground karst water channels from the point A to the point B, such as a net-shaped path diagram or a tree-shaped path diagram.

2. The method for exploring hidden karst pipelines according to claim 1, wherein a method for determining the upstream point A and the downstream point B in Step 1 is as follows:
    determining typical outcrops of the underground karst water channels, comprising but not limited to surface outcrops and borehole outcrops, by means of geological reconnaissance, investigation and drilling in the survey area; then, determining the upstream point A and the downstream point B of the underground karst pipeline by measurement of waterheads of all the outcrops and regional hydrogeological analysis.

3. The method for exploring hidden karst pipelines according to claim 1, wherein, in Step 2, the two grounding electrodes are connected to each other through a wire and are connected to the transmitter, wherein, the wire with low-resistance may be placed outside of the survey area as far as possible to avoid interference with the data collection.

4. The method for exploring hidden karst pipelines according to claim 1, wherein, in Step 3, a receiving mode adopted by the receiving coil is of collecting waveform with full time, full frequency and high sampling rate.

5. The method for exploring hidden karst pipelines according to claim 1, wherein, in Step 4, if the grounding resistance is too high, an electrolyte can be continuously added into the underground karst water at the pole A, and by considering the pollution problem of groundwater, the table salt is suitable as the electrolyte; the waveform emissioned by the electromagnetic emission system is a mixed electromagnetic wave comprising n frequencies, and a coding method thereof takes a pseudo-random signal sequence such as a 2n sequence, m sequence, M sequence, etc.; or, taking the direct superposition of multiple sine waves, and determining the composition of the frequency and the coding method according to a burial depth of the hidden karst pipelines.

6. A system for exploring hidden karst pipelines, comprising: an air mobile equipment, a transmitter, a receiving sensor, a receiver, an electrode, a power supply device and a data processing device;
    the transmitter, the power supply device and underground karst water channels in a karst pipeline connected with two electrodes form an electromagnetic emission system, wherein the two electrodes are laid at an upstream point A and a downstream point B of the karst pipeline respectively;
    the air mobile equipment, towing the receiver, collects electromagnetic signal continuously by following a designed route above the survey area, to complete an area-based measurement, so as to obtain an observed data in the whole survey area; and
    the data processing device processes the obtained observed data to delineating a concrete distribution of the underground karst water channels, wherein the data processing device comprises:
    a discrete Fourier transform module, being configured to perform a discrete Fourier transform on the observed signal to obtain information of an amplitude and a phase corresponding to each single frequency electromagnetic wave after the discrete Fourier transform;
    a normalization processing module, being configured to draw an amplitude contour map after normalizing the amplitude, and to draw a phase contour map of after normalizing the phase; and a calculation and delineating module, being configured to calculate an electrical conductivity in the survey area and draw a plane distribution map thereof, wherein the different high and low values of the electrical conductivity are shown in different color scales, and a result thereof is a tree root-like shape, which may make the potential hidden karst pipelines be seen clearly; according to and integrating abnormal areas in the amplitude contour map, the phase contour map and the conductivity distribution map, delineating a concrete distribution of the underground karst water channels from the point A to the point B, such as a net-shaped path diagram or a tree-shaped path diagram.

7. The system for exploring hidden karst pipelines according to claim 6, wherein the transmitter is an electromagnetic wave transmitter; the receiver is an electromagnetic wave receiver.

8. The system for exploring hidden karst pipelines according to claim 7, wherein the electromagnetic wave receiver is a receiving coil or an electromagnetic rod.

* * * * *